(12) United States Patent
Yoshida

(10) Patent No.: US 10,795,546 B2
(45) Date of Patent: Oct. 6, 2020

(54) METHOD FOR DISPLAYING USER INTERFACE IN ACCORDANCE WITH DEVICE CONNECTION

(71) Applicant: Canon Kabushiki Kaisha, Tokyo (JP)

(72) Inventor: Hiroyoshi Yoshida, Ohta-ku (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 405 days.

(21) Appl. No.: 14/171,599

(22) Filed: Feb. 3, 2014

(65) Prior Publication Data

US 2014/0149914 A1 May 29, 2014

Related U.S. Application Data

(63) Continuation of application No. 12/853,625, filed on Aug. 10, 2010, now Pat. No. 8,683,369, which is a
(Continued)

(30) Foreign Application Priority Data

Aug. 29, 2005 (JP) .................................. 2005-248197

(51) Int. Cl.
| | | |
|---|---|---|
| G06F 3/0484 | (2013.01) | |
| H04N 1/00 | (2006.01) | |
| H04N 1/32 | (2006.01) | |

(52) U.S. Cl.
CPC ......... *G06F 3/0484* (2013.01); *H04N 1/0035* (2013.01); *H04N 1/00437* (2013.01);
(Continued)

(58) Field of Classification Search
CPC .............................. G06F 3/0484; G06F 3/048
See application file for complete search history.

(56) References Cited

U.S. PATENT DOCUMENTS 5,751,965 A * 5/1998 Mayo .................. H04L 41/0213
709/224
6,041,265 A * 3/2000 Suzuki ............... G03G 15/5016
355/32
(Continued)

FOREIGN PATENT DOCUMENTS

| EP | 1349366 A2 | 10/2003 |
| EP | 1553525 A2 | 7/2005 |
| JP | 2005-072818 A | 3/2005 |

OTHER PUBLICATIONS

HP Development Company, L.P.; "HP Photosmart 2600/2700 series all-in-one User Guide;" http://h10032.www1.hp.com/ctg/Manual/c00241244.pdf; 2004; pp. 1-241.

*Primary Examiner* — Jeanette J Parker
(74) *Attorney, Agent, or Firm* — Canon U.S.A., Inc. IP Division

(57) ABSTRACT

A user interface is controlled to support a user using an image processing apparatus which can perform a task, for example, for storing image data obtained by a scanner in a memory or printing the image by a printer. In a display apparatus which can display a user interface including operation items, a user's intention is estimated, and an operation by the user for specifying a task is supported. For example, statuses of an image input unit and an image accept unit relating to execution of the task are monitored, and display forms of the operation items are varied in accordance with results of the monitoring.

16 Claims, 19 Drawing Sheets

Related U.S. Application Data continuation of application No. 11/460,906, filed on Jul. 28, 2006, now Pat. No. 7,802,187.

(52) U.S. Cl.
CPC ...... *H04N 1/00347* (2013.01); *H04N 1/32112* (2013.01); *H04N 2201/0058* (2013.01); *H04N 2201/0084* (2013.01); *H04N 2201/0087* (2013.01); *H04N 2201/0094* (2013.01); *H04N 2201/3205* (2013.01); *H04N 2201/3226* (2013.01); *H04N 2201/3276* (2013.01)

(56) References Cited

U.S. PATENT DOCUMENTS

| | | | | |
|---|---|---|---|---|
| 6,108,492 | A * | 8/2000 | Miyachi | H04N 1/00002 358/1.15 |
| 6,498,658 | B1 | 12/2002 | Sekikawa | |
| 7,802,187 | B2 * | 9/2010 | Yoshida | H04N 1/0035 358/442 |
| 8,683,369 | B2 * | 3/2014 | Yoshida | H04N 1/0035 715/772 |
| 2001/0024298 | A1 * | 9/2001 | Yoshida | H04N 1/21 358/444 |
| 2003/0086111 | A1 * | 5/2003 | Akiyoshi | G06F 21/608 358/1.14 |
| 2003/0095295 | A1 | 5/2003 | Yajima | |
| 2003/0177368 | A1 * | 9/2003 | Morita | G03G 15/5091 713/185 |
| 2003/0184803 | A1 * | 10/2003 | Yamada | H04N 1/33307 358/1.16 |
| 2003/0200371 | A1 * | 10/2003 | Abujbara | G06F 9/4443 710/305 |
| 2005/0047812 | A1 * | 3/2005 | Takemura | G03G 15/5075 399/75 |
| 2005/0154782 | A1 * | 7/2005 | Yoshida | H04N 1/32117 709/206 |
| 2006/0044580 | A1 * | 3/2006 | Maeda | H04N 1/00352 358/1.9 |
| 2006/0053167 | A1 * | 3/2006 | Yamada | G06F 17/30067 |
| 2006/0282472 | A1 * | 12/2006 | Ng | H04N 1/2112 |

\* cited by examiner

FIG.6

| TASK | DOCUMENT | MEMORY | ... |
|---|---|---|---|
| Copy | 1 | 0 | ... |
| ScanToSend | 1 | 0 | ... |
| ScanToStore | 1 | 1 | ... |
| StorePrint | 0 | 1 | ... |
| StoreSend | 0 | 1 | ... |
| AddressBook | 0 | 0 | ... |
| ... | ... | ... | ... |

FIG.11

| TASK | DOCUMENT | MEMORY | SCHEDULE | ... |
|---|---|---|---|---|
| Copy | 1 | 0 | 0 | ... |
| ScanToSend | 1 | 0 | 0 | ... |
| ScanToStore | 1 | 1 | 0 | ... |
| StorePrint | 0 | 1 | 1 | ... |
| StoreSend | 0 | 1 | 0 | ... |
| AddressBook | 0 | 0 | 0 | ... |
| ... | ... | ... | ... | ... |

FIG.12

| DATE | START | END | TITLE | MEMBER | NOTE | LINK |
|---|---|---|---|---|---|---|
| 4/8 | 1000 | 1230 | PLANING MEETING OF PRODUCT OF THE NEXT GENERATION | | | ID: 203045 |
| 4/10 | 1730 | 2100 | SALES REPORT | | | ID: 307458 |
| 4/15 | 1000 | 1230 | PLANING MEETING OF PRODUCT OF THE NEXT GENERATION | | | ID: 203045 |
| 4/22 | 1230 | 1345 | BASE EXTRAORDINARY MEETING | | | |
| | | | | | | |

FIG.13

| ID | STYLE | HOME | AUTHOR |
|---|---|---|---|
| 203045 | 1$^{st}$&3$^{rd}$Mon | ¥¥Projects¥NextProducts¥Meeting¥NextDocs | Hiro. Yoshida |
| ... | ... | ... | ... |
| 307458 | | | |

FIG.15

| TASK | DOCUMENT | MEMORY | TEMPORARILY STORED DOCUMENT | ... |
|---|---|---|---|---|
| Copy | 1 | 0 | 0 | ... |
| ScanToSend | 1 | 0 | 0 | ... |
| ScanToStore | 1 | 1 | 0 | ... |
| StorePrint | 0 | 1 | 0 | ... |
| StoreSend | 0 | 1 | 0 | ... |
| AddressBook | 0 | 0 | 0 | ... |
| PendingStore | 0 | 1 | 1 | ... |
| PendingPrint | 0 | 0 | 1 | ... |
| ... | ... | ... | ... | ... |

FIG.16

| DATE | TIME | JOBSETTING | MACHINE |
|---|---|---|---|
| 2005/06/01 | 08:31:25 | Copy:Copies=25:Duplex:DoubleStaple | OfficeA:4F:OA corner |
| 2005/06/26 | 16:52:23 | Copy:Copies=1:Duplex:4in1 | OfficeA:4F:OfficeSide |
| 2005/06/30 | 14:55:47 | Print:Prints=10:Duplex:2in1 | OfficeA:4F:OfficeSide |
| 2005/07/01 | 08:22:31 | Copy:Copies=25:Duplex:DoubleStaple | OfficeA:4F:OA corner |
| ... | ... | ... | ... |
| 2005/08/01 | 08:22:31 | Copy:Copies=25:Duplex:DoubleStaple | OfficeA:4F:OA corner |
| 2005/08/01 | 13:15:17 | Search:Source=Doc:<br>Result=¥¥UserG¥20050801131517 | MeetingRoomA1F |

FIG.18

| TASK | DOCUMENT | MEMORY | EXTERNAL ASSOCIATION | ... |
|---|---|---|---|---|
| Copy | 1 | 0 | 0 | ... |
| ScanToSend | 1 | 0 | 0 | ... |
| ScanToStore | 1 | 1 | 0 | ... |
| StorePrint | 0 | 1 | 1 | ... |
| StoreSend | 0 | 1 | 0 | ... |
| AddressBook | 0 | 0 | 0 | ... |
| ... | ... | ... | ... | ... |

FIG.19

| ID | EVENT | DETAIL | FLAG |
|---|---|---|---|
| UserA | StoreDocument | ¥¥Projects¥NextProducts¥Meeting¥NextDocs | 1 |
| UserB | ReadDocument | ¥¥Projects¥NextProducts¥Meeting¥NextDocs | 0 |
|  |  |  |  |

METHOD FOR DISPLAYING USER INTERFACE IN ACCORDANCE WITH DEVICE CONNECTION

CROSS-REFERENCE TO RELATED APPLICATIONS

This application is a Continuation of U.S. patent application Ser. No. 12/853,625 filed Aug. 10, 2010, which is a Continuation of U.S. patent application Ser. No. 11/460,906 filed Jul. 28, 2006, which was issued Sep. 21, 2010 in U.S. Pat. No. 7,802,187; which claims priority from Japanese Patent Application No. 2005-248197 filed Aug. 29, 2005, each of which is hereby incorporated by reference herein in their entireties.

BACKGROUND OF THE INVENTION

Field of the Invention

The present invention relates to a display apparatus and a display method for displaying a user interface used for generating an instruction to an image processing apparatus which can perform a predetermined task on the basis of an operation by the user.

Description of the Related Art

In recent years, a multifunction peripheral device (MFP), which is based on, for example, a copying machine and can perform a plurality of functions, can implement not only a single function task such as copy, facsimile, print or box storage but also provide new functions in which these single functions are associated with each other. Further, these new functions can be remarkably complicated.

With such complicated functions, there is a problem that a user needs a large amount of effort to find and select processing to be performed by the multifunction peripheral (hereinafter, the processing is referred to as a "task").

A supporting technique for performing such a task includes, for example, a technique discussed in Japanese Patent Application Laid-Open No. 10-240818. This technique can facilitate reducing an operation burden on a user for performing suitable processing such as a schedule management or the like corresponding to input information. More specifically, a required job can be processed by a suitable apparatus in accordance with time.

In the above-described operation environment, the supporting technique for selecting a task further includes a searching method (1) and a classification indication method (2) which are performed via a user interface on a display apparatus.

In the searching method (1), a user enters a character string corresponding to a desired task to cause the display apparatus to display an operation item for generating an instruction to perform the task. When a complicated task in which a plurality of tasks is combined is searched for, the needed task can be selected by gradually performing searching operations. Thus, the searching method is effective even for an inexperienced user. However, even when a simple task is searched for, a similar searching operation is required. Therefore, the operation is not always simple depending on tasks to be searched for.

In the classification indication method (2), tasks are grouped for every type and hierarchized for every detailed function. A user proceeds with operations gradually in such a manner as to select a group and, then, select a detailed function. In this case, the user needs to assign a classification to each task in advance. Therefore, the user cannot easily use the interface until the user recognizes the classification. Thus, it is not an intuitive operation environment. As the number of functions is increased, the classification becomes more complicated.

SUMMARY OF THE INVENTION

An exemplary feature of the present invention is to provide a display apparatus and a display control method in which the above-described drawbacks are at least mitigated.

Another exemplary feature of the present invention is to provide a display apparatus and a display control method which can facilitate easily performing an operation for executing a task.

Still another exemplary feature of the present invention is to provide a display apparatus and a display control method which can estimate a task desired by a user and vary a display mode accordingly.

The above-described features and further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a table illustrating an example of a priority determination table according to the first embodiment of the present invention.

FIG. 11 is a table showing an example of a priority determination table according to a second embodiment of the present invention.

FIG. 12 is a table showing an example of schedule information according to the second embodiment of the present invention.

FIG. 13 is a table showing an example of data information according to the second embodiment of the present invention.

FIG. 15 is a table showing an example of a priority determination table according to a third embodiment of the present invention.

FIG. 16 is a table showing an example of a history information management table according to the third embodiment of the present invention.

FIG. 18 is a table showing an example of a priority determination table according to a fourth embodiment of the present invention.

FIG. 19 is a table showing an example of an external association information management table according to the fourth embodiment of the present invention.

DETAILED DESCRIPTION OF THE EMBODIMENTS

Exemplary embodiments of the invention will be described in detail below with reference to the drawings.

First Embodiment

Figure 1:
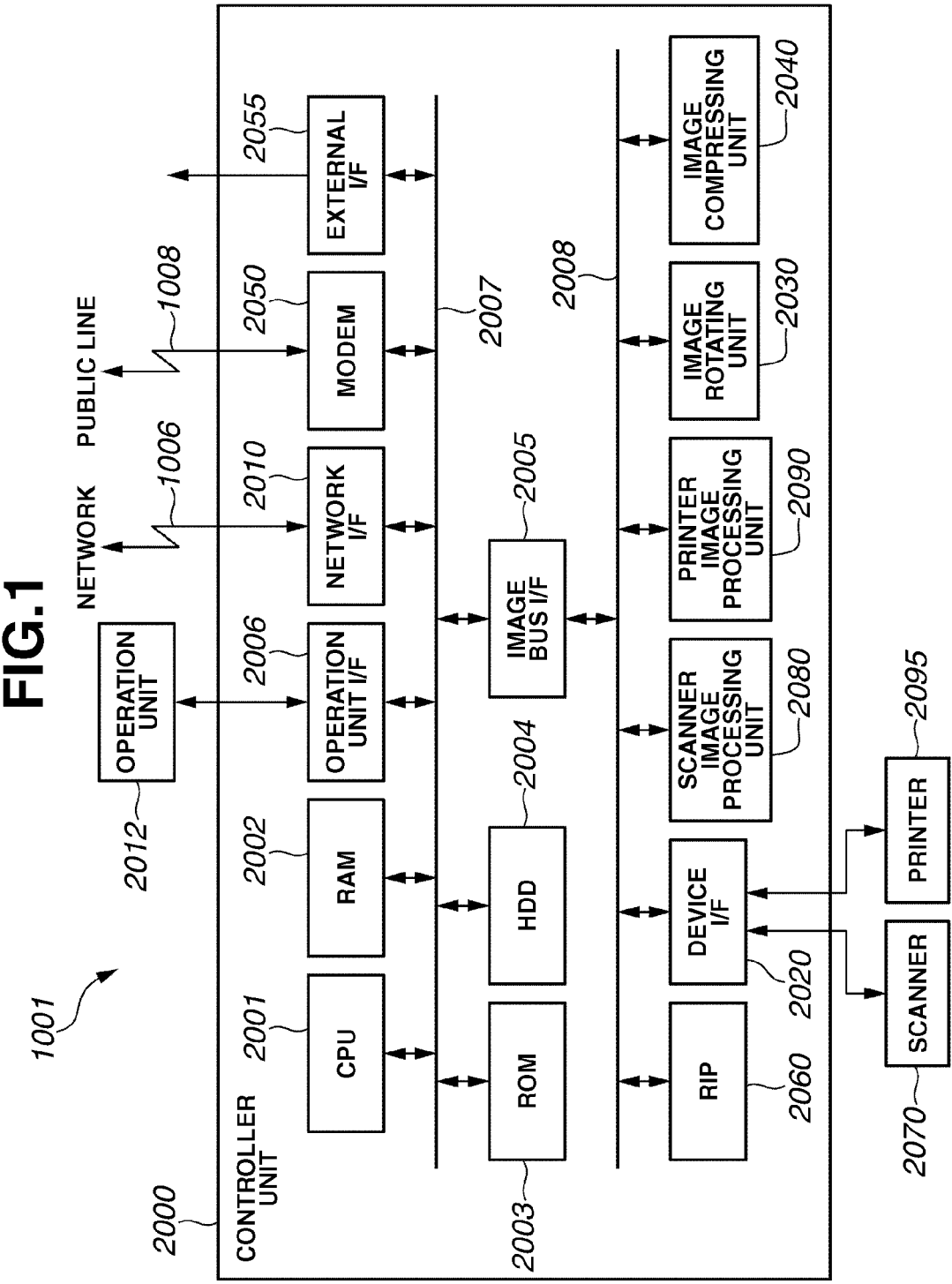
FIG. 1 is a block diagram showing a configuration of main units of an MFP according to a first embodiment of the present invention.

FIG. 1 is a block diagram showing a configuration of main units of an MFP according to a first embodiment of the present invention.

In this embodiment, an MFP having a plurality of functions is used and described as an example of an image processing apparatus. These functions include a copy function, a print function, a facsimile function, a data transfer function and a data search function.

An MFP 1001 includes a controller unit 2000. The controller unit 2000 is connected with a scanner 2070 and a printer 2095. The scanner 2070 is an image input device and the printer 2095 is an image output device. Further, the controller unit 2000 is connected with an operation unit 2012.

The controller unit 2000 provides control to realize the copy function for printing and outputting image data read by the scanner 2070 using the printer 2095. In addition to this function, the controller unit 2000 provides control to realize the data transfer function for executing input/output of image data and device information by connecting with a network 1006 or a public line 1008 (WAN). Of course, the controller unit 2000 provides control to realize the above-described functions, such as the facsimile function and the like in addition to these two functions.

The controller unit 2000 includes a CPU 2001. The CPU 2001 boots an operating system (OS) using a boot program stored in a ROM 2003. Further, the CPU 2001 executes an application program stored in a hard disk drive (HDD) 2004 on the OS so as to perform each process. A RAM 2002 is used as a work area in which the CPU 2001 performs each process. The RAM 2002 provides not only the work area but also an image memory area for temporarily storing image data. The HDD 2004 stores the application program and the image data.

The CPU 2001 is connected with an operation unit interface (I/F) 2006, a network I/F 2010, a modem 2050, and an image bus I/F 2005 via a system bus 2007, together with the ROM 2003 and the RAM 2002.

The operation unit I/F 2006 is an interface, for example, with an operation unit 2012 including a touch panel, and outputs image data to the operation unit 2012. The image data can be displayed on the operation unit 2012. Further, the operation unit I/F 2006 transfers information input via the operation unit 2012 by a user to the CPU 2001.

In addition, as for the operation unit 2012, any type can be used as long as it can display a user interface which is a screen used for a user to perform an operation. Thus, the operation unit 2012 can be configured with a display unit (a liquid crystal display (LCD), a cathode-ray tube (CRT), or the like) and an input unit (a keyboard, a pointing device, or the like), instead of the touch panel.

The network I/F 2010 is connected with a network 1006, and executes input/output of information with an external apparatus on the network 1006. The modem 2050 is connected with a public line 1008, and executes input/output of information via the public line 1008.

In addition, more particularly, the network 1006 can be the Internet, a LAN, a WAN, a telephone line, a leased digital line, an ATM, a frame relay line, a communication satellite line, a cable television line, or a wireless line for broadcasting data. Further, the network 1006 can be a so-called communication network realized by combining these lines. Thus, any network can be used as long as it can transfer and receive data.

An external I/F 2055 can be connected with an external apparatus (a removable memory, a digital camera, a hard disk, or the like), and executes input/output of information with the external apparatus. For example, the external apparatus I/F 2055 includes a USB interface, an IEEE1394 interface, or the like.

The image bus I/F 2005 is a bus bridge connecting the system bus 2007 with an image bus 2008 for transferring image data at high speeds. The image bus I/F 2005 converts a data form of input data. The image bus 2008 is configured with, for example, a PCI bus or an IEEE1394 bus. On the image bus 2008, a raster image processor (hereinafter, referred to as "RIP") 2060, a device I/F 2020, a scanner image processing unit 2080, a printer image processing unit 2090, an image rotating unit 2030, and an image compressing unit 2040 are provided.

The RIP 2060 is, for example, a processor for rasterizng page description language (PDL) code to a bit map image. The device I/F 2020 is connected with the scanner 2070 and the printer 2095. Further, the device I/F 2020 performs synchronous/asynchronous conversion of image data.

The scanner image processing unit 2080 performs various processes with respect to input image data, such as correcting, processing, and editing the data. The printer image processing unit 2090 performs various processes with respect to output image data corresponding to the printer 2095, such as correcting and converting resolution. The image rotating unit 2030 performs a rotation of image data. The image compressing unit 2040 compresses multi-valued image data to JPEG data, and binary image data to compression data such as JBIG, MMR and MH. Further, the image compressing unit 2040 performs expansion processing of data.

The hardware configuration of the scanner 2070 and the printer 2095 of the MFP 1001 is described below with reference to FIG. 2.

Figure 2:
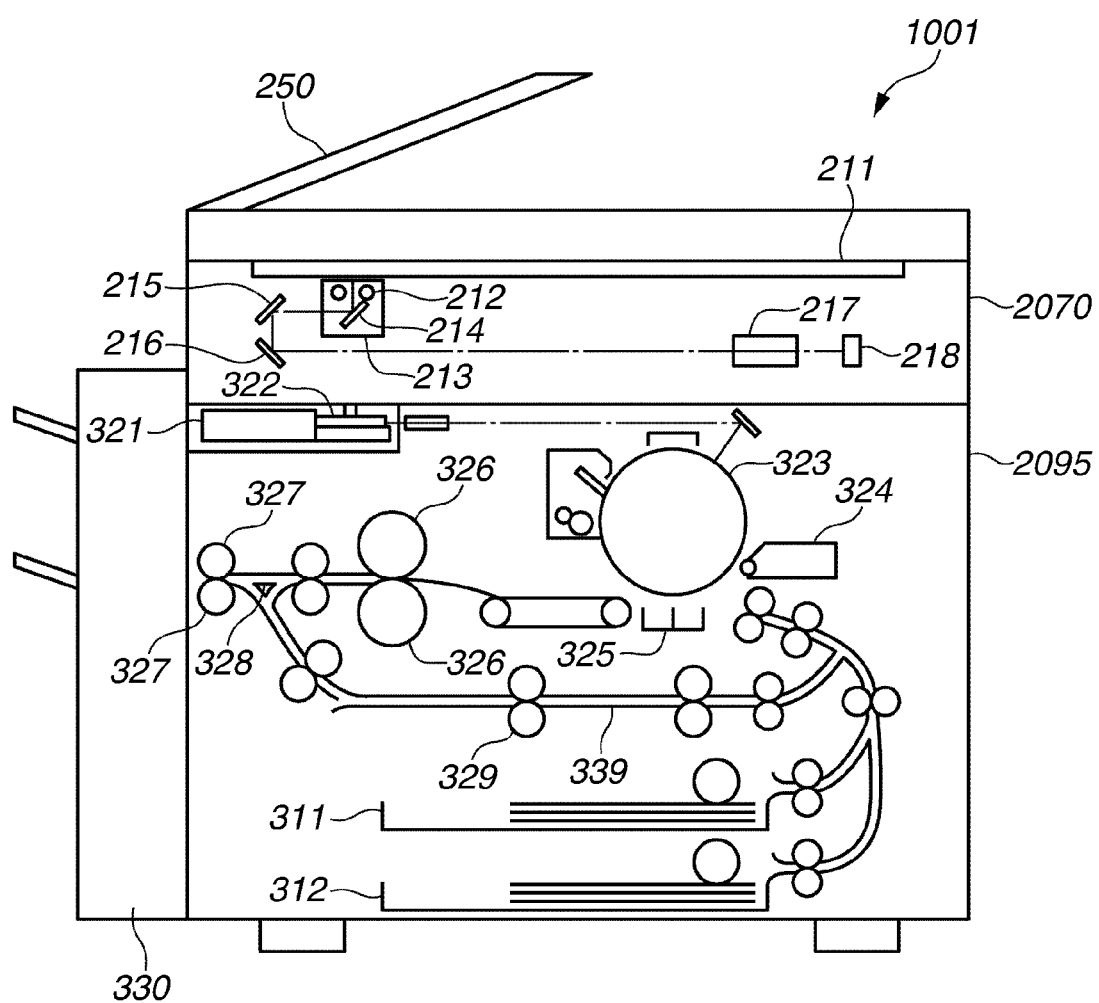
FIG. 2 is a side cross-sectional view illustrating a hardware configuration of a scanner and a printer of the MFP according to the first embodiment of the present invention.

FIG. 2 is a side cross-sectional view illustrating the hardware configuration of the scanner 2070 and the printer 2095 according to the first embodiment of the present invention.

The scanner 2070 and the printer 2095 are integrally configured as illustrating in FIG. 2. However, the scanner 2070 and the printer 2095 can be separately configured and mutually connected via an interface so as to be operated. The scanner 2070 includes a document feeding unit 250. The document feeding unit 250 feeds documents sequentially onto a platen glass 211 one by one from a front page, and discharges the documents from the platen glass 211 to a discharge tray (not shown) each time a reading operation for each document is completed. The document feeding unit 250 includes a sensor for detecting that the document is placed, and transmits the detected information to the CPU 2001.

When a document is fed onto the platen glass 211, a lamp 212 is lit, and a moving unit 213 starts to move. As the moving unit 213 is moved, reading and scanning of the document on the platen glass 211 are performed. During the reading and scanning, reflected light from the document is guided to a CCD image sensor (hereinafter, referred to as "CCD") 218 via mirrors 214, 215, and 216 and a lens 217. Then, an image of the document is formed on an imaging surface of the CCD 218. The CCD 218 converts the image formed on the imaging surface to an electrical signal. The electrical signal is subjected to predetermined processing and then supplied to a control apparatus (not shown). In addition, the scanner 2070 includes a function for detecting setting of a document by detecting a light-blocked area when the document is placed on the platen glass 211, in addition to setting of the document by the document feeding unit 250.

The printer 2095 includes a laser driver 321. The laser driver 321 drives a laser light-emitting unit 322 on the basis of image data input from the control apparatus. Thereby, laser light corresponding to the image data is emitted from the laser light-emitting unit 322. The laser light is irradiated onto a photosensitive drum 323 while scanning. On the photosensitive drum 323, an electrostatic latent image is formed by the irradiated laser light. The electrostatic latent image is visualized as a toner image by a toner fed from a developing unit 324. In synchronization with irradiation timing of the laser light, a recording sheet is fed to a part between the photosensitive drum. 323 and a transfer unit 325 via a feeding path from a cassette 311 or 312. Then, the toner image on the photosensitive drum 323 is transferred to the fed recording sheet by the transfer unit 325.

The recording sheet having the toner image transferred thereon is fed to a pair of fixing rollers (a heating roller and a pressurizing roller) 326 via a feeding belt. The pair of fixing rollers 326 heats and presses the recording sheet, and fixes the toner image on the recording sheet. After passing through the pair of fixing rollers 326, the recording sheet is discharged to a discharge unit 330 by a pair of discharging rollers 327. The discharge unit 330 includes a sheet processing apparatus which can apply post-processing such as sorting and stapling to recording sheets.

Further, when a two-sided recording mode is set, after the recording sheet is fed to the pair of discharge rollers 327, the rotating direction of the pair of discharge rollers 327 is reversed so that the recording sheet is transferred to a paper re-feeding path 339 by a flapper 328. The recording sheet transferred to the paper re-feeding path 339 is re-fed to a part between the photosensitive drum 323 and the transfer unit 325 at the above-described timing, and a toner image is transferred to the rear surface of the recording sheet.

In addition, although a laser beam type is used as an example of a printing type of the printer 2095 in FIG. 2, another printing type such as an ink-jet type or a thermal transfer type can be used.

A detailed configuration of the operation unit 2012 is described below with reference to FIG. 3.

Figure 3:
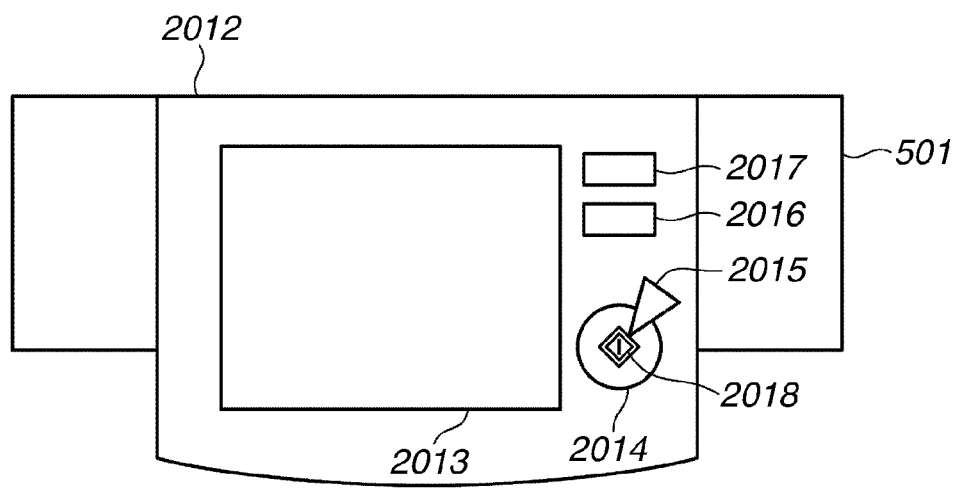
FIG. 3 is a view illustrating a detailed configuration of an operation unit of the MFP according to the first embodiment of the present invention.

FIG. 3 is a view illustrating a detailed configuration of the operation unit 2012 of the MFP 1001 according to the first embodiment of the present invention.

An LCD display unit 2013 has a configuration in which a touch panel sheet is stuck on a liquid crystal display. The LCD display unit 2013 displays an operation screen (a user interface) for operation by a user of the MFP 1001. Further, when a part of the LCD display unit 2013 corresponding to a key displayed on the operation screen is pushed by the user, the LCD display unit 2013 transmits position information of the part to the CPU 2001 of the controller unit 2000. Thereby, the CPU 2001 determines which operation the user has performed. A start key 2014 is used when the user generates an instruction to start processing such as a reading operation for a document image.

A two-color (green and red) light-emitting diode (LED) 2018 is provided at the center part of the start key 2014, in which the two colors indicate whether the start key 2014 can be used or not. A stop key 2015 is operated when the user stops an operation. An ID key 2016 is operated when the user enters a user ID or a department ID of the user. A reset key 2017 is used when the user initializes settings defined via the operation unit 2012. Further, an authentication device 501 is used when authentication processing for accepting/rejecting an access to the MFP 1001 is performed. For example, the authentication device 501 includes an input unit for entering a user name, a password, and the like, a reading device for reading an authentication card, or a biometrics authentication device. A user who is operating the MFP 1001 can be identified by the input from the ID key 2016 or the authentication by the authentication device 501. Thus, a use environment of the MFP 1001 can be set corresponding to the identified user.

Further, a physical key such as a numeric keypad or a button key can be provided on the operation unit 2012 although it is not illustrated in FIG. 3.

An example of an operation screen displayed on the operation unit 2012 is described below with reference to FIG. 4.

Figure 4:
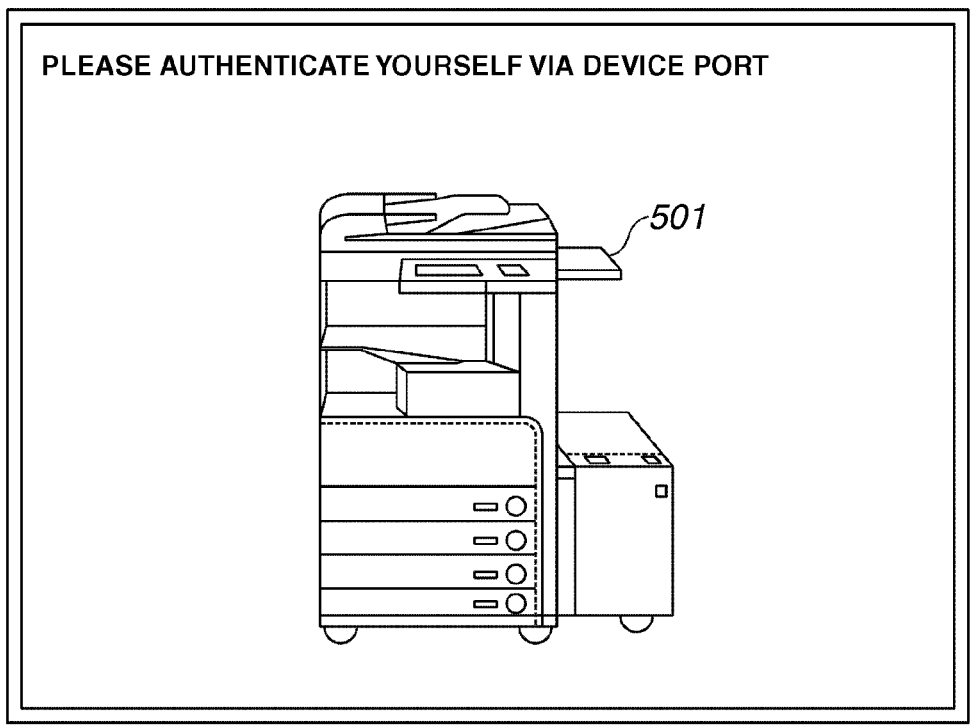
FIGS. 4, 5, and 7 to 9 are views illustrating examples of an operation screen displayed on an operation unit according to the first embodiment of the present invention.

FIG. 4 is a view illustrating an example of an operation screen displayed on the operation unit 2012 according to the first embodiment of the present invention.

Figure 5:
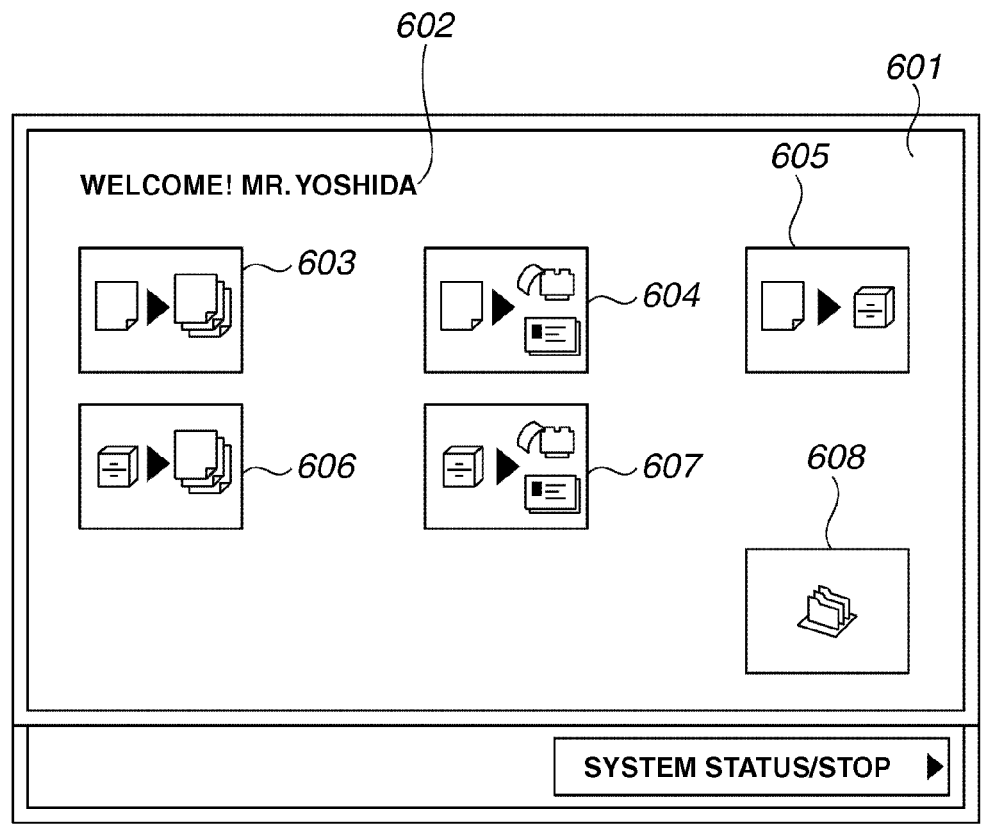

The operation screen illustrated in FIG. 4 is an example in which the authentication is set for an access to the MFP 1001. The MFP 1001 stands by with this operation screen at first when starting. When a user puts an ID card, having user information written thereon, on a device port, the user information is acquired via a wireless communication and is authenticated by the authentication device 501. After the user information is authenticated by the authentication device 501, a top menu 601 (an initial operation screen) illustrated in FIG. 5 is displayed. The top menu can have different modes for respective users.

In addition, the device port in the display in FIG. 4 has a space for putting thereon a device such a digital camera, a cellular phone, or a PDA, in addition to the authentication device 501, and the CPU 2001 can recognize which device is put on the space. A device type is recognized by, for example, wireless-communication to a wireless module mounted on each device for logical connection and acquiring information of the device type from the device.

On the top menu 601, keys corresponding to tasks which can be used in the MFP 1001 are displayed in addition to the user information 602 indicating the authenticated user. At this time, a display of a group of groups on the top menu 601 is in an initial form. In the initial form, a display size of each key is a standard display size (an initial display size), and these keys are respectively displayed with approximately equal sizes. Further, a standard display position (an initial display position) is assigned to each key.

In this case, a Copy key 603, a ScanToSend (eMail/Fax) key 604, a ScanToStore key 605, a StorePrint key 606, a StoreSend key 607, and a transmission address call key 608 are displayed.

The Copy key 603 is a key for performing a copy task for printing a document image read from the scanner 2070 by the printer 2095. The ScanToSend (eMail/Fax) key 604 is a key for transmitting a document image read from the scanner 2070 via e-mail with attachment, or for performing an e-mail/fax transmission task for facsimile transmission. The ScanToStore key 605 is a key for performing a data store task for storing a document image read from the scanner 2070 in the HDD 2004. The StorePrint key 606 is a key for performing a print task for reading image data stored in the HDD 2004 and printing the image data by the printer 2095. The StoreSend key 607 is a key for performing a data transmission task for reading image data stored in the HDD 2004 and transmits the image data to an external apparatus via the network 1006. The transmission address call key 608 is a key for calling address information which is a destination of an e-mail transmission, a facsimile transmission, or a data transmission.

A group of functions realized in the MFP 1001 or a composite function obtained by arbitrarily combining the functions can be arranged on the operation screen by preparing corresponding keys. Further, when all of the prepared keys cannot be displayed on the operation screen at the same time, an image switch unit such as an image scroll key can be provided and a suitable number of keys can be arranged for each image so as to operate each key. Further, a plurality of sub screens can be prepared and key groups belonging to a common category can be arranged so as to operate each key.

In the display shown in FIG. 5, for example, when the CPU 2001 receives a signal from a sensor of the document feeding unit 250 or a place-on sensor of the platen glass 211 to determine that a document is set on the scanner 2070, the CPU 2001 refers to a priority determination table shown in FIG. 6. The priority determination table is provided for managing information which determines the priority of displays of keys corresponding to tasks. In addition, the priority determination table is stored, for example, in the RAM 2002 or the HDD 2004.

Further, the priority determination table in the first embodiment manages a flag for changing the priority of a display of a key corresponding to each task. This management is carried out according to an operation status of the MFP 1001 for every task which can be used in the MFP 1001.

In an example illustrated in FIG. 6, especially, various operation status items are provided for indicating the operation status. For example, items indicating a status when a document is set ("document"), a status when an external apparatus including a memory function is connected ("memory"), and the like, are provided. In addition, as for the item "memory", it indicates a status that an external apparatus including a memory function is put on the device port or an external apparatus is connected via a physical connection unit. However, in addition to these statuses, when a user can use the HDD 2004 included in the MFP 1001, it may be determined similarly that a memory is already connected. That is, the item "memory" may indicate a status that a user can store and read image data in and from a predetermined memory. Further, flags ("1" or "0") corresponding to the tasks are managed with respect to each operation status item. More particularly, as for a task in which the flag is "1", when such an operation status occurs, a process for gradually changing (raising) the priority of display of a key corresponding to the task is performed.

Further, in the display shown in FIG. 5, when a document is set on the scanner 2070, the CPU 2001 refers to the priority determination table. As a result of the reference, the CPU 2001 selects tasks (Copy, ScanToSend, and ScanToStore) in which the flag of the operation status item "document" is "1".

Then, the CPU 2001 raises, by one step, the priorities of display of the keys corresponding to the selected tasks, and redraws (updates) a display content of the top menu 601. In this case, the CPU 2001 performs emphasis display control according to the priority of display of the key corresponding to each task. For example, when a key is in the high priority, the CPU 2001 performs emphasis display such as enlarging a display size of the key, displaying character information showing a function name at a key top, or varying a display position of the key. The emphasis display means a display on which an operation control (an operation item) targeted for operation can be easily distinguished from the other operation controls not targeted for operation.

Figure 7:
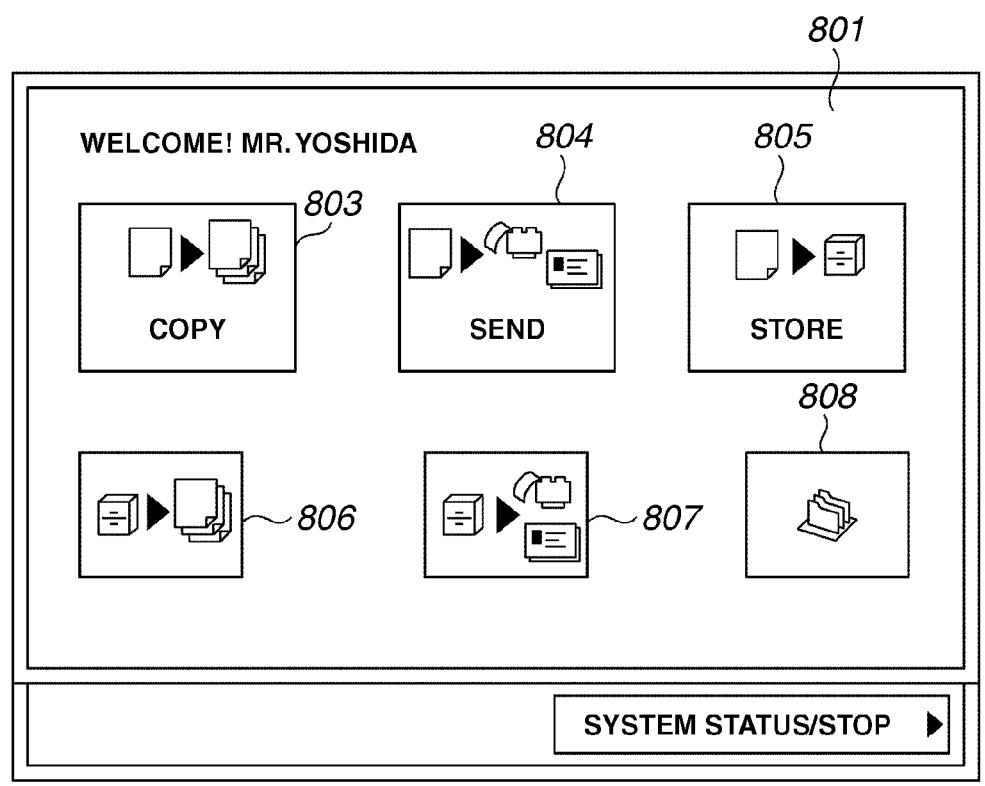

More specifically, when a document is set on the scanner 2070, the top menu 601 in the display form shown in FIG. 5 is redrawn to a top menu 801 in the display form shown in FIG. 7. That is, the keys 603 to 605 among the keys 603 to 608 corresponding to the tasks in FIG. 5 are redrawn to keys 803 to 805 in the display forms shown in FIG. 7. On the other hand, the keys 606 to 608 in FIG. 5 are maintained in the same display forms as those in FIG. 5, as keys 806 to 808 shown in FIG. 7.

While the keys 603 to 605 are displayed with the standard display size in FIG. 5, the keys 803 to 805 are displayed with a first display size, which is larger than the standard display size, in FIG. 7.

Further, in the display form in FIG. 7, when the document is removed from the scanner 2070, the priorities of display of the keys 801 to 803 corresponding to the tasks which are emphasis-displayed are lowered and returned to the original priorities. Thus, the display form returns to the display form shown in FIG. 5.

Further, in the display form in FIG. 5, when an external apparatus including a memory function is connected (it is in a status that image data can be stored in a memory and image data can be read from the memory), the CPU 2001 refers to the priority determination table. As a result of the reference, the CPU 2001 selects tasks (ScanToStore, StoreSend, and StorePrint) in which the flag of the operation status item "memory" is "1".

Then, the CPU 2001 raises, by one step, the priorities of display of the keys corresponding to the selected tasks, and redraws (updates) a display content of the top menu 601.

Figure 8:
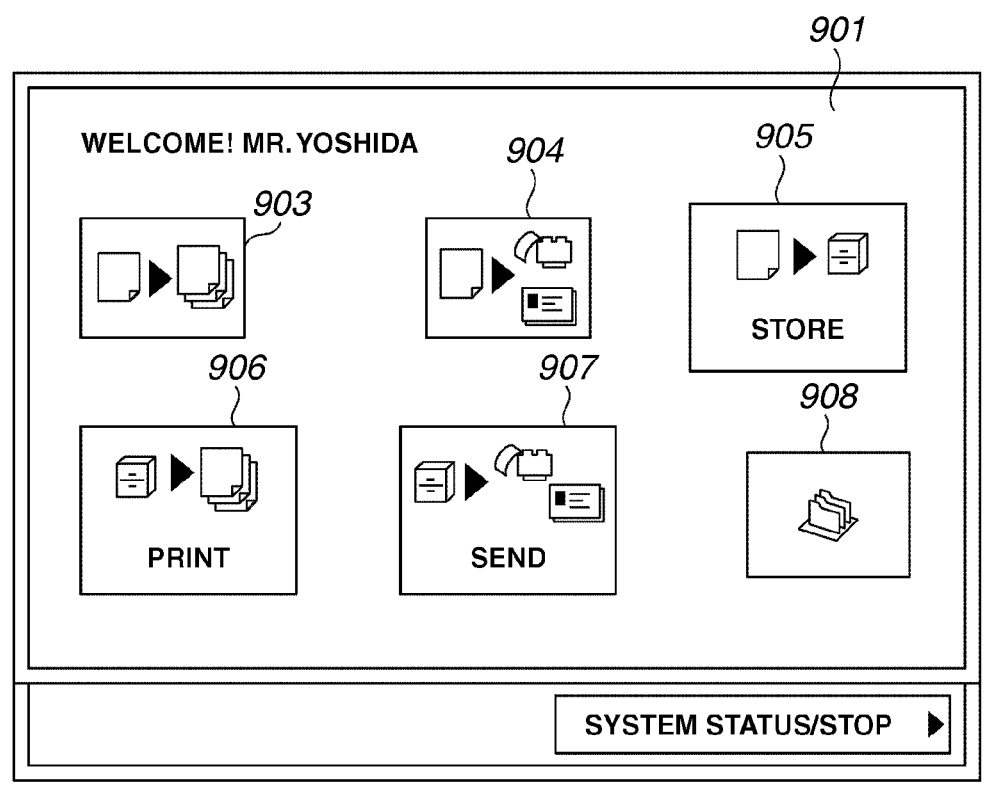

More particularly, when the status is that an access to a predetermined memory is possible, for example, when an external apparatus including a memory function is connected, the top menu 601 in the display form in FIG. 5 is redrawn to a top menu 901 in a display form in FIG. 8. That is, the keys 605 to 607 among the keys 603 to 608 corresponding to the tasks in FIG. 5 are redrawn to keys 905 to 907 shown in FIG. 8. On the other hand, the keys 603, 604, and 608 are maintained in the same display forms as those in FIG. 5, as keys 903, 904, and 908 shown in FIG. 8.

In particular, the keys 605 to 607, which are displayed with the standard display size in FIG. 5, are displayed with a first display size, which is larger than the standard display size, as keys 905 to 907 in FIG. 8.

Further, in the display form in FIG. 8, when a document is set again on the scanner 2070, the CPU 2001 refers to the priority determination table. In this case, the status is that the CPU 2001 can access a memory and a document is set on the scanner 2070. Therefore, the CPU 2001 selects a task (ScanToStore) in which the flag of the operation status item "document" is "1" and the flag of the operation status item "memory" is "1".

In this case, since the flags are "1" with respect to two kinds of operation status items, the CPU 2001 rises, by two steps, the priority of display of the key corresponding to the selected task and redraws (updates) the display content of the top menu 901.

Figure 9:
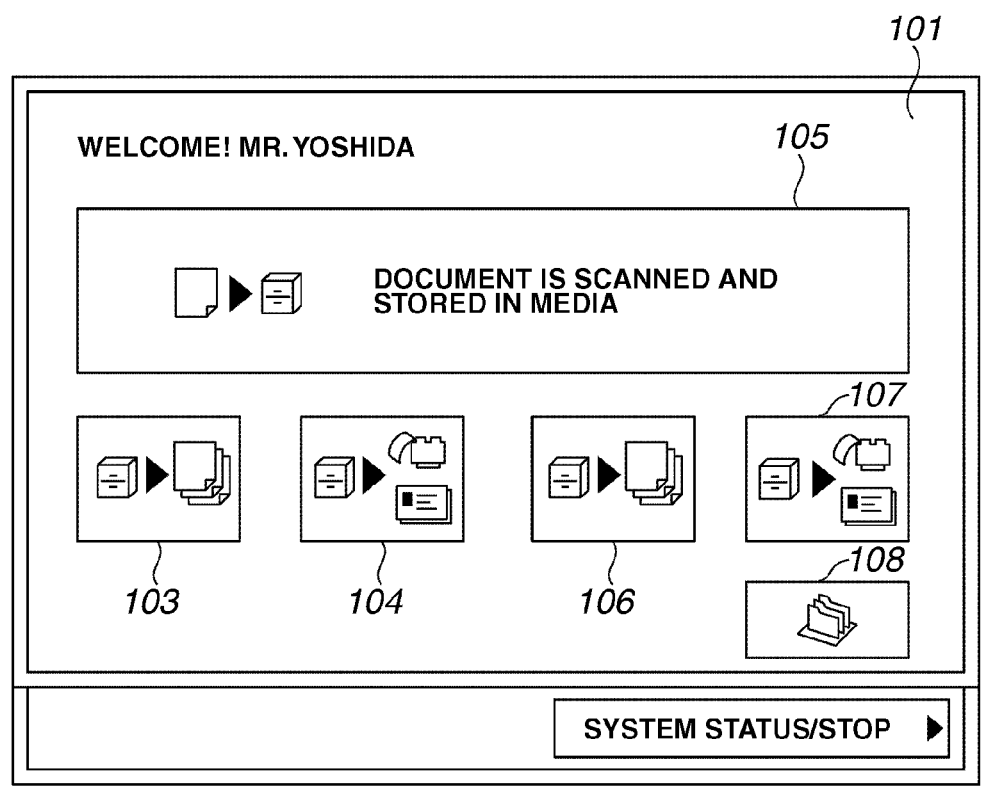

More particularly, when a document is set on the scanner 2070 in the status that an access to a memory is possible with connection to an external apparatus including a memory function, the top menu 901 in the display form in FIG. 8 is redrawn to a top menu 101 in the display form in FIG. 9. That is, the keys 903 to 908 corresponding to the tasks in FIG. 8 are redrawn to the display forms of keys 103 to 108 shown in FIG. 9.

In FIG. 9, display sizes and display positions of the keys are controlled corresponding to the priorities before and after redrawing.

For example, the priority of display of the key 905 in FIG. 8 is raised two steps, so that the display form of the key 905 is changed to a display form as the key 105 in FIG. 9. That is, since the key 905 has a higher priority, the key 905 is changed to have a display size as illustrated in FIG. 9 (a second display size which is larger than the first display size) so as to be easily noted and easily visually confirmed by a user. In this case, especially, the key 905 is displayed at a predetermined position of the top menu 101 (in this case, the center on the upper side, that is, the top display position) with a larger size than that of the other keys.

Since the priorities of display of the keys 906 and 907 are lowered one step, the keys 906 and 907 are changed to the display forms as the keys 106 and 107 shown in FIG. 9. That is, since the priorities of display of the keys 906 and 907 become lower than those in the display forms in FIG. 8, the display size is changed from the first display size to the standard display size in the display form in FIG. 9. Further, the display positions of the other keys including the keys 906 and 907 are changed in accordance with the change of the display position of the key 905.

In the display form in FIG. 9, when the connection is interrupted by removing the external apparatus including a memory function from the device port, the display form is changed to the display form shown in FIG. 7. On the other hand, when the document is removed from the scanner 2070, the display form is changed to the display form shown in FIG. 8.

In the first embodiment, the display of operation items (keys) for accessing various task types which can be used in the MFP 1001 is controlled according to the operation status with respect to the MFP 1001, as described above. That is, a task in which a user wishes to perform is estimated, and a display mode of a user interface is changed to support the task.

Display control processing performed in the first embodiment is described below with reference to FIG. 10.

Figure 10:
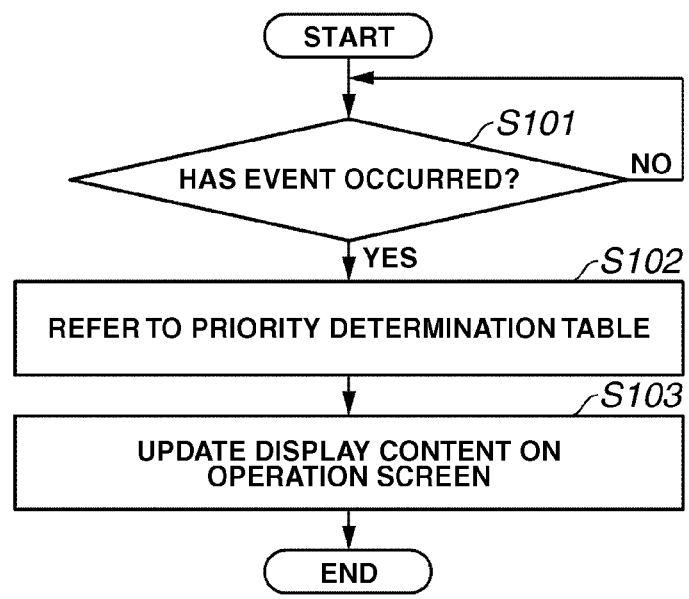
FIG. 10 is a flowchart showing a display control processing according to the first embodiment of the present invention.

FIG. 10 is a flowchart showing display control processing in the first embodiment of the present invention.

The display control processing is performed, for example, under the control of the CPU 2001 using a control program stored, for example, in the HDD 2004.

The control program is started at the time when a user is authenticated by the authentication device 501 and an initial operation screen corresponding to the user is displayed.

Under this control program, the MFP 1001 monitors that the following various event types occur or not, that is, an event occurring by an operation via the operation unit 2012, an event for detecting setting of a document on the scanner 2070, an event for detecting connection of an external apparatus with the external I/F 2055, and the like.

Further, when a specific event occurs, display control processing for updating a display content on an initial operation screen (FIG. 5) corresponding to a content of the event is performed.

First, it is determined whether an event has occurred or not in step S101. When no event has occurred (NO in step S101), processing stands by until an event has occurred. On the other hand, when an event has occurred (YES in step S101), processing proceeds to step S102.

In step S102, the priority determination table is referred to on the basis of the event information indicating the event which has occurred. In step S103, the display content is updated, as described above, to change the display size and the display position of each operation item (key) on the operation screen on the basis of a result of the reference.

In addition, the priority determination table can be preconstructed. A specific set screen can be prepared so as to change the set content in the priority determination table by the operation of a user at arbitrary timing.

The task using a document is not limited to the above-described tasks. Various tasks can be prepared and added, that is, for example, a task for searching from an image obtained by scanning a document and a character string obtained by subjecting the image to character recognition processing, and the like. Further, a task from an external memory can be also added.

The event can include an event where a predetermined device is put on a device port. For example, when the digital camera is put on the device port, a menu for printing and transmitting image data in the digital camera and writing the image data into a memory in the MFP 1001 is displayed. Further, when a cellular phone is put on the device port, a menu for printing and transmitting image data and e-mail data and writing the data into a memory in the cellular phone, and a menu for taking an address book in the cellular phone are displayed.

Further, the processing in FIG. 10 can also be performed in a second embodiment which is described below.

As described above, according to the first embodiment, the operation status of an image processing apparatus is monitored and the priority of an operation control (operation item) displayed on an operation unit is determined according to the operation status. Further, according to the priority, the display mode of the operation control which is necessary for a user is emphasized. Thereby, the operation control which is necessary for a user can be recognized at a glance. Thus, in an image processing apparatus which can provide multiple functions, a user can easily select an operation control for performing an intended function.

For example, when a document is detected, it can be inferred that a user wishes to perform a task relating to reading the document. When a memory can be accessed, it can be inferred that a user wishes to perform a task relating to writing data to the memory and reading data from the memory. For example, when setting of a document is detected, it is in a status that a preparation for inputting image data is completed, and when a memory can be accessed, it is in a status that a preparation for the memory to receive the input image data is completed. Thus, it can be inferred that a user wishes to perform a task relating the above-described statuses. Then, a user can be supported so as to generate an instruction for performing a desired task on the basis of the result of these inferences. In addition, when a printer cannot be used, the display mode of an operation item for using the printer such as a Copy button is not emphasized. Further, when a transmission function cannot be operated, the display mode of an operation item for using the transmission function is not emphasized. This processing is intended to prevent a user from selecting a task in which acceptance of image data is not yet prepared.

Second Embodiment

The first embodiment has described the configuration in which the display form of each operation control on the operation screen is controlled according to the type of an event (the operation status on the apparatus) detected by the MFP 1001. However, the present invention is not limited to this configuration.

The MFP 1001 may permit a user to use the MFP 1001 after authenticating the user. Further, in this case, the MFP 1001 can separately acquire schedule information, for every user, which indicates a plan (schedule) of a task which is used by the user.

The second embodiment describes a configuration in which the display form of each operation control on the operation screen is controlled using a priority determination table including the schedule information of a user in addition to the items described in the first embodiment. That is, the display form of each operation control on the operation screen is controlled according to a use status (a use schedule) of a user.

Hereinafter, portions similar to those in the first embodiment are omitted from the description, and only different portions are described.

In the second embodiment, the priority determination table has, for example, a configuration shown in FIG. 11. In this embodiment, an item "schedule" for managing a flag with respect to a use schedule of each task is provided in addition to the operation status items in the priority determination table shown in FIG. 6 in the first embodiment.

Then, when the MFP 1001 is installed at a base place such as a meeting room in a company, the MFP 1001 can recognize the existence of a use schedule for every function thereof on the basis of the schedule information of a user which is acquired separately. Thereby, the display form of each operation control can be controlled according to the use schedule.

In addition, for example, the schedule information of a user is managed in the MFP 1001, or in a database server provided on a network.

For example, the schedule information has a configuration shown in FIG. 12.

The schedule information shown in FIG. 12 includes a use date of a task (Date), a starting (Start)/ending (End) time of use, a meeting title (Title) where a user attends, and a link information (Link) for accessing data which is a processing target by the MFP 1001.

Further, data information which indicates a storing destination of actual data with respect to the link information exists. For example, the data information has a configuration shown in FIG. 13.

The data information illustrated in FIG. 13 includes an ID for identifying data, address information (Home) indicating a storing destination of the data, and an author (Author) of the data.

Further, using this information, the MFP 1001 can control the display form of each operation control on the operation screen using the schedule information of a user, in addition to the configuration of the first embodiment.

A specific example of the operation will now be described.

When the MFP 1001 has succeeded in authenticating a user, the CPU 2001 refers to the schedule information (FIG. 12). At this time, if the time obtained from a clock in the MFP 1001 is, for example, 9:45 on April 8, the CPU 2001 recognizes, as a user status, that the meeting "PLANNING MEETING OF PRODUCT OF THE NEXT GENERATION" will start within a predetermined time (for example, within 30 minutes).

Further, in this case, the CPU 2001 refers to the priority determination table. As a result of the reference, the CPU 2001 selects a task (StorePrint) in which a flag of the operation status item "schedule" is "1". Then, the CPU 2001 raises, by one step, the priority of display of a key corresponding to the selected task. At this time, it is decided that the display size of the key is changed to the first display size from the standard display size.

In addition to this operation, the CPU 2001 refers to the data information (FIG. 13) using the link information in the schedule information (FIG. 12). As a result of the reference, the CPU 2001 determinates whether there is actual data in a data storing destination "¥¥Projects¥NextProducts¥Meeting¥NextDocs" which is indicated by the address information in the data information. If there is actual data, the CPU 2001 further raises, by one step, the priority of display of the key corresponding to the task (StorePrint). That is, in this case, the CPU 2001 eventually raises, by two steps, the priority of display of the key corresponding to the task (StorePrint). Thus, it is decided that the display size of the key is changed from the standard display size to the first display size and, then, from the first display size to the second display size. Further, it is also decided that the display position is changed to the top display position.

Figure 14:
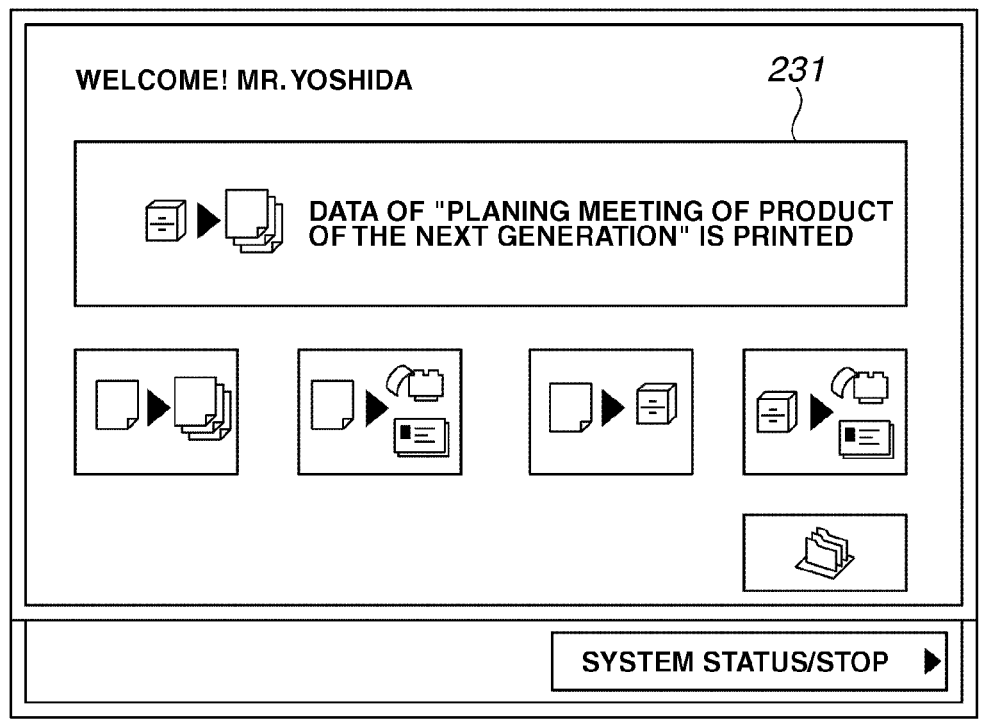
FIG. 14 is a view illustrating an example of an operation screen displayed on an operation unit according to the second embodiment of the present invention.

In this case, if the display content of the initial operation screen is in the display form shown in FIG. 5, the display content is changed to the display content shown in FIG. 14. That is, the key 606 in FIG. 5 is redrawn to a key 231 in FIG. 14.

In particular, the key 231 in FIG. 14 is displayed with blinking where a display color is repeatedly changed between a priority color display and a standard color display, in addition to controlling the display size and the display position. Further, character information indicating a meeting title obtained from the schedule information is displayed in the key 231.

As described above, according to the second embodiment, the display form of each operation control on the operation screen is controlled according to a status of a user (a use schedule) who uses the apparatus. In the second embodiment, a key corresponding to a task scheduled to be used is changed to have a display form which can be easily noted by the user. Thus, when the user uses the apparatus actually, the can find out an intended task more efficiently Third Embodiment The second embodiment has described the configuration in which the display form of each operation control on the operation screen is controlled according to a use status (a use schedule) of a user. However, the present invention is not limited to this configuration. For example, an operation history of a user can be used as the use status of a user, and the display form of each operation control on the operation screen can be controlled according to this use status.

In this case, for example, the operation of a user who has used in the past is, for example, an operation in which a user searched for desired image data and temporarily stored the image data in a memory such as the HDD 2004 (a data search function as a task). In addition, image data to be searched for by the data search function is managed, for example, in an external apparatus including a memory function or an external apparatus on a network. When the user operates the MFP 1001 to control the external apparatus, the user can perform the data search function.

Further, after performing the data search function, the user can authentically store and print the image data (a temporarily stored document) stored in the memory, such as the HDD 2004, at another time. Further, as a task for realizing these functions, there are a PendingStore (authentically storing a temporarily stored document) and a PendingPrint (printing a temporarily stored document).

Thus, a third embodiment describes a configuration in which a final task is completed at a different time.

In addition, hereinafter, portions similar to those in the first and second embodiments are omitted from the description, and only different portions are described.

In the configuration of the third embodiment, for example, the priority determination table has a configuration shown in FIG. 15. In the third embodiment, an item of "Temporarily Stored Document" for managing a flag with respect to a temporarily stored document, which is temporarily stored by the operation performed by a user in the past, is provided in addition to the operation status items in the priority determination table in FIG. 6 in the first embodiment.

On the other hand, the MFP 1001 keeps a history information management table for managing history information of an operation (a task) for every user. The history information of an operation is generated by the operation by a user who used the MFP 1001 in the past. For example, the history information has a configuration shown in FIG. 16.

The history information illustrated in FIG. 16 includes a date and time (Date, Time) when a task was generated, a set content of a task (JobSetting), and an image processing apparatus (Machine) which performed task processing. In this case, the set content of a task includes operation types (copy, print, and data search), and set information. In the case of the copy, the set information includes the number of copies made, two-sided/one-sided copy, staple, and the like. In the case of the print, the set information includes the number of prints made, N-up print specification, and the like. In the case of the data search, the set information includes search conditions, a storing destination of search results, and the like.

Further, in the third embodiment, it is possible to recognize whether a user performed processing for generating a temporarily stored document in the past, on the basis of the history information. Thus, the display form of each operation control can be controlled according to the existence of the temporarily stored document.

In addition, although the history information is generally managed in the MFP 1001, the history information can be managed in a data server on a network. Thus, various MFPs can share the history information.

The MFP 1001 can control the display form of each operation control on the operation screen using the history information, in addition to the configuration of the first embodiment.

Hereinafter, an example of the operation is described specifically.

When the MFP 1001 has succeeded in authenticating a user, the CPU 2001 refers to the history information management table. Existence of a temporarily stored document by the data research function is determined based on the history information in the history information management table. When a temporarily stored document exists, the CPU 2001 refers to the priority determination table. As a result of the reference, the CPU 2001 selects tasks (PendingStore and PendingPrint) in which a flag of the operation status item "Temporarily Stored Document" is "1". Then, the CPU 2001 raises, be one step, the priorities of display of keys corresponding to the selected tasks.

Figure 17:
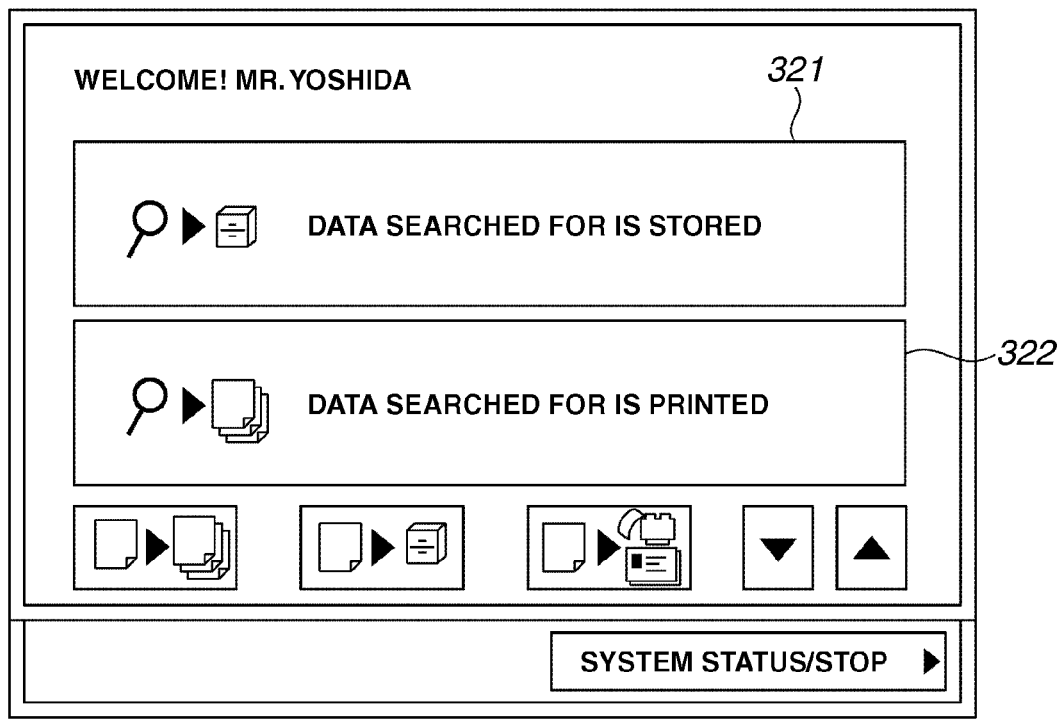
FIG. 17 is a view illustrating an example of an operation screen displayed on an operation unit according to the third embodiment of the present invention.

In this case, when the display content of the initial operation screen is in the display form in FIG. 5, the display content is changed to have a display form in FIG. 17. In addition, in FIG. 5, a key corresponding to the task (the data search function) for generating "Temporarily Stored Document" is not illustrated. However, it is assumed that the key is illustrated with the standard display size like the other keys. Further, the standard display size of these keys is changed to a display size of keys 321 and 322 shown in FIG. 17, and character information indicating operations intended by the user is displayed in the keys 321 and 322.

When the user operates the key 321 corresponding to the task PendingStore on the operation screen illustrated in FIG. 17, a temporarily stored document is read from the storing destination indicated by "Result=¥¥UserG¥20050801131517" in the history information illustrated in FIG. 16. Then, the read temporarily stored document is stored in the storing destination designated by the user. Further, when the user operates the key 322 corresponding to the task PendingPrint, a temporarily stored document is read from the storing destination indicated by "Result=¥¥UserG¥20050801131517" in the history information shown in FIG. 16. Then, the read temporarily stored document is printed using a printing method designated by the user.

As described above, according to the third embodiment, when a task performed in the past by a user has high possibility to be used in another task after that, the display form of each operation control on the operation screen is controlled according to the use status (the use schedule) of a user using the apparatus. In the third embodiment especially, a key corresponding to a task having possibility to be used next time is changed to have a display form which can easily be noted by a user. The task having possibility to be used next time is selected from among the tasks used in the past. Thus, when the user uses the apparatus, the user can find out an intended task more efficiently.

Fourth Embodiment

The second and third embodiments have described configurations in which the display form of each operation control on the operation screen is controlled according to the use status (the use schedule) of a user. However, the present invention is not limited to this configuration. For example, an operation of another user may be used as the use status of a user so as to control the display form of each operation control on the operation screen according to the use status. In this case, the operation of another user corresponds to the operation of a user described in the third embodiment.

In the following description portions similar to those in the first and second embodiments are omitted, and only different portions are described.

In the configuration according to the fourth embodiment, for example, the priority determination table has a configuration shown in FIG. 18. In the fourth embodiment, an item "External Association" for managing a flag with respect to the operation of another user is provided in addition to the operation status items in the priority determination table in FIG. 6 in the first embodiment.

On the other hand, the MFP 1001 keeps an external association information management table for managing external association information indicating an operation of each user who has used the MFP 1001. For example, the external association information has a configuration shown in FIG. 19.

The external association information illustrated in FIG. 19 includes a user name or a user ID for specifying each user, a operation content of the user (Event), and address information indicating a storing destination of data to be processed by the operation content (Detail). In addition, the external association information includes a flag indicating an external association target (External Association Target: "1", External Association Non-target: "0").

In addition, "StoreDocument" which is the operation content in FIG. 19 indicates that another user stored image data in an external apparatus on a network or in a predetermined folder in the MFP 1001. Further, "ReadDocument" indicates that another user referred to image data in the predetermined folder.

In an example shown in FIG. 19, it can be seen that a User A stored image data in "¥¥Projects¥NextProducts¥Meeting¥NextDocs". On the other hand, it can be seen that a User B referred to image data in "¥¥Projects¥NextProducts¥Meeting¥NextDocs". At this time, another user can perform, in cooperation, another processing with respect to the image data stored in the folder by the operation of the User A. In such a case, the flag in the external association information management table is set to "1".

Further, when the above-described information is used, the MFP 1001 can control the display form of each operation control on the operation screen using the external association information with respect to another user in addition to the configuration of the first embodiment.

Hereinafter, an example of the operation is described specifically.

First, when the MFP 1001 has succeeded in authenticating a user, the CPU 2001 refers to the external association information management table. The CPU 2001 determines whether an operation content by another user is the external association target based on the external association information in the external association information management table. The determination is performed on the basis of the flag in the external association information management table. When a task to be externally associated exists as a result of the determination, the CPU 2001 refers to the priority determination table. As a result of the reference, the CPU 2001 selects a task (StorePrint) in which a flag of the operation status item "External Association" is "1". Then, the CPU 2001 raises, by one step, the priority of display of a key corresponding to the selected task.

Figure 20:
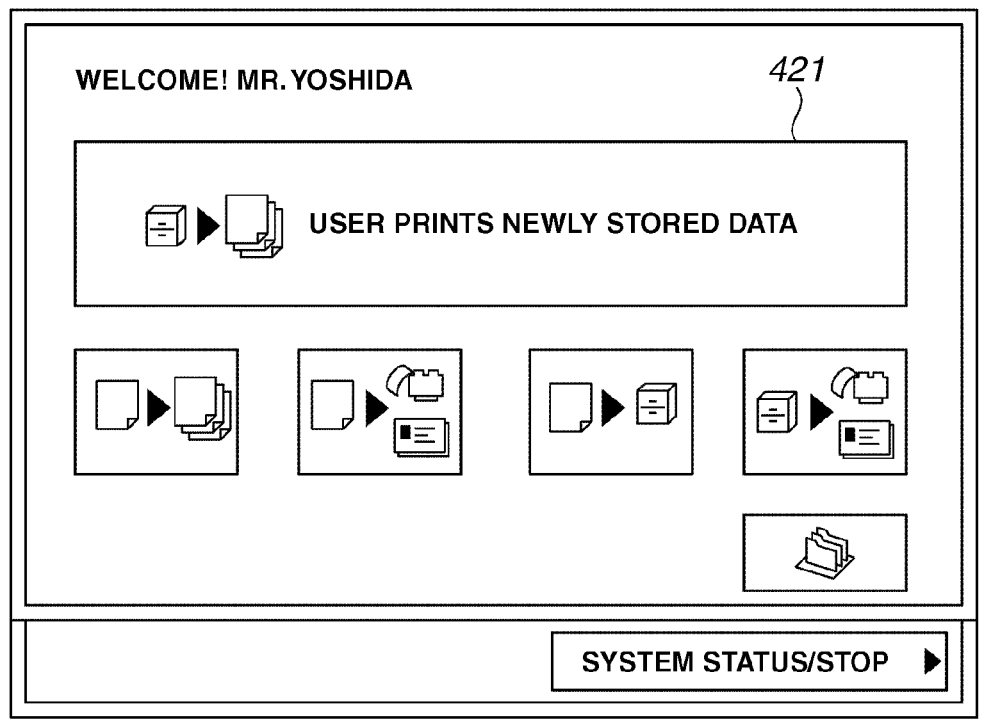
FIG. 20 is a view illustrating an example of an operation screen displayed on an operation unit according to the fourth embodiment of the present invention.

In this case, when the display content of the initial operation screen is in the display form in FIG. 5, the display content is changed to have a display form in FIG. 20 from the display form in FIG. 5. At this time, the key 606 in FIG. 5 is changed to have a display size of a key 421 illustrated in FIG. 20, and character information for guiding an intended operation by a user is displayed in the key 421.

When the user operates the key 421 corresponding to the task "StorePrint" on the operation screen illustrated in FIG. 20, the user refers to a storing destination indicated by "¥¥Projects¥NextProducts¥Meeting¥NextDocs" in the external association information illustrated in FIG. 18. Further, as a result of the reference, a stored document list is displayed in the order of new storing time, and the user can instruct printing a desired stored document.

As described above, according to the fourth embodiment, when a task by a user has high possibility to be used as a task by another user, the display form of each operation control on the operation screen is controlled according to the status of a user using the apparatus. In the fourth embodiment, especially, a key corresponding to a task having possibility to be used by another user (a task having possibility to be used in cooperation between users) is changed to have a display form which can easily be noted by a user. The task having possibility to be used by another user is selected from among the tasks used in the past by a certain user. Thus, when a user uses the apparatus, the user can find out a desired task more efficiency.

Fifth Embodiment

The first to fourth embodiments have described the configuration in which the display form of each operation control on the operation screen is controlled on the basis of the priority determination table and each status type such as the operation status and the user status with respect to the MFP 1001. However, it can be supposed that the above-described controlling of the display form is unnecessary according to the application and objective.

Thus, a fifth embodiment describes a configuration in which after the display form of each operation control on the operation screen is updated once, the display form is returned to the original display form. That is, this embodiment describes a configuration for canceling the control of the display form of the operation control based on the priority, which is described in the first to fourth embodiments.

Figure 21:
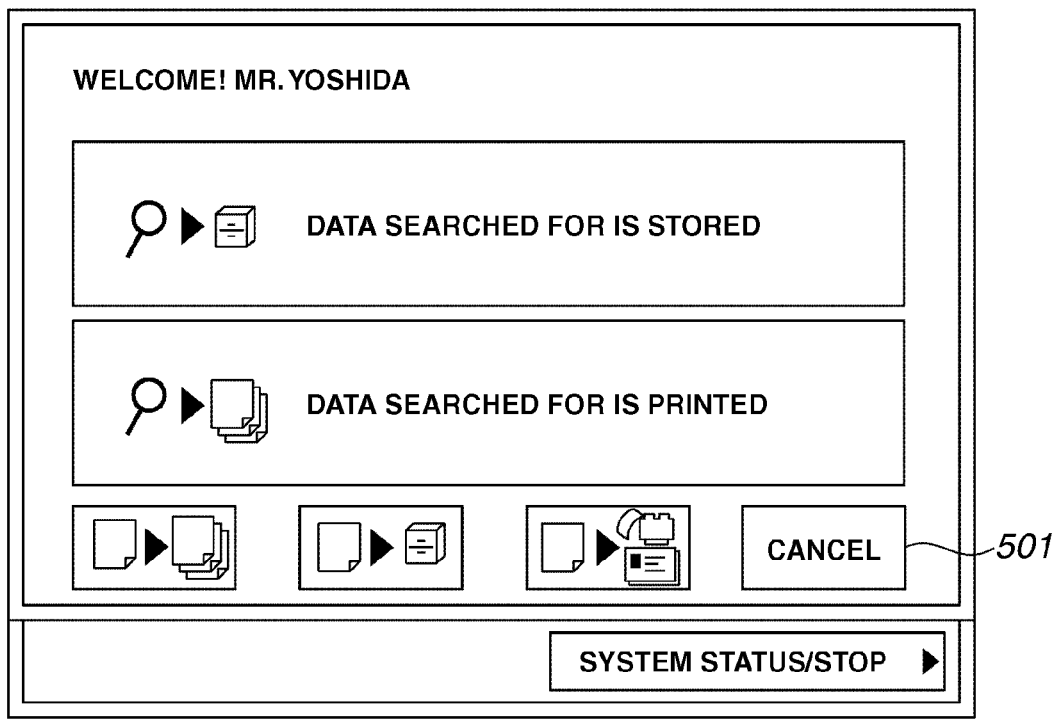
FIG. 21 is a view illustrating an example of an operation screen displayed on an operation unit according to a fifth embodiment of the present invention.

This cancellation can be realized, for example, by providing a cancellation key 501 on the operation screen as illustrated in FIG. 21. FIG. 21 has a configuration in which the cancellation key 501 is arranged on the operation screen shown in FIG. 17 in the third embodiment. Further, when the cancellation key 501 is operated, the display form is returned to have the operation screen displayed before being updated. In this case, the display form in FIG. 21 is returned to the display form in FIG. 5.

As described above, according to the fifth embodiment, when the display control is performed as described in the first to fourth embodiments, the display form can be returned to the operation screen in the standard display status if necessary. It is effective when a user performs a task other than the task based on detection of an event.

In addition, the display form on the operation screen described in each of the first to fifth embodiments is an example, and various display control operations can be performed according to the application and objective. That is, as for the display position, the display size, the display color, and the blinking display of an operation control, the display size or the display position can be periodically changed, the color-coded display can be performed, a colored frame can be attached to an outer frame of the operation control, or a shadow can be attached to the back of the operation control. In addition, in the above description, the displays of the keys having low priorities are not changed. However, the keys having low priorities can be changed to have small displays so as to emphasize the keys having high priorities. In addition, a gray-out display or a display/nondisplay control can be performed on the operation items having low priorities. If a user can be easily guided to an intended task, any suitable display mode can be used.

Further, in the above-described embodiments, the operation screen is displayed on the operation unit which is provided in the MFP 1001. However, a display apparatus provided separately from the MFP 1001 can be used if it can detect an event of the MFP 1001 and can be used to operate the MFP 1001.

Further, each above-described embodiment can be realized independently, and an embodiment implemented by arbitrary combining the above-described embodiments can be realized according to the application and objective.

Although the embodiments have been described above, the present invention includes an embodiment being as, for example, a system, an apparatus, a method, a program, or a storage medium. More particularly, the present invention can be applied to a system having a plurality of devices or an apparatus having a single device. Further, an internal configuration of each apparatus can be implemented by suitably combining a mechanized configuration, hardware, and software.

In addition, the present invention provides a program of software (a program corresponding to a flow chart shown in the drawings in the embodiments), which can realize the functions of the above-described embodiments, to a system or an apparatus directly or remotely. Further, the present invention includes a case where a computer of the system or the apparatus can read the provided program code and execute it.

Therefore, the program code itself realizes the present invention. The program code is installed into the computer in order to realize the function processing of the present invention. That is, the present invention includes the computer program itself for realizing the function processing thereof.

In this case, as for the computer program, any type of program, such as object code, a program executed by an interpreter, and script data supplied to an OS, can be used, if it has a function of a program.

As for the storage medium for supplying a program, for example, a flexible disk, a hard disk, or an optical disk, can be used. Furthermore, the storage medium includes a magnetic-optical disk, an MO disk, a CD-ROM, a CD-R, a CD-RW, a magnetic tape, a nonvolatile memory card, a ROM, and a DVD (DVD-ROM, DVD-R).

Further, as for a supplying method of a program, the program can be supplied by the steps of connecting a client computer to a website on the Internet using a browser of the client computer, and downloading a computer program itself of the present invention or a compressed file including an automatic installation function to a storage medium such as a hard disk from the website of the connecting destination. Further, the program can be supplied by the steps of dividing the program code for constructing the program of the present invention to a plurality of files, and downloading each program from different websites. That is, the present invention also includes a WWW server which enables the program file to be downloaded to a plurality of users, where the program file is provided for realizing the function processing of the present invention by the computer.

Further, the program can be supplied by the steps of encrypting the program of the present invention storing the encrypted program in a storage medium such a CD-ROM, supplying the CD-ROM to users, making the users, who cleared predetermined conditions, to download the key information for canceling the encryption from the website via the Internet, making the users to perform the encrypted program using the key information, and installing the program to the computer by the users.

Further, the functions of the above-described embodiments are realized by making the computer to perform the read program. Further, an OS running on the computer performs a part or the whole of actual processing on the basis of the instruction of the program, and the functions of the above-described embodiments can be realized by this processing.

Furthermore, the program read from the storage medium is written into a memory which is included in a function expansion board inserted into the computer or a function expansion unit connected to the computer. Then, a CPU, which is included in the function expansion board or the function expansion unit, performs a part or the whole of the actual processing, and thereby, the functions of the above-described embodiments can be realized by this processing.

Accordingly, the present invention can provide an image processing apparatus, a control method, and a program thereof which can facilitate easily and efficiency performing an operation for performing each function provided in the apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A multifunction peripheral capable of connecting to an external storage, the multifunction peripheral comprising:
   a display;
   a print unit;
   a scan unit to read a document;
   a processor; and
   a memory storing instructions which, when executed by the processor, causes the multifunction peripheral to:
      display a menu screen, on the display, the menu screen including objects each for receiving an operation for causing the multifunction peripheral from a user to perform a function of the multifunction peripheral, the objects including a first object and a second object,
      in a case where an external storage is not connected to the multifunction peripheral, display the first object and the second object displayed on the menu screen in a first display, and
      in a case where the external storage is connected to the multifunction peripheral, change a display of the first object and a display of the second object on the menu screen from the first display to a second display, the first object and the second object displayed in the second display being able to receive the operation of the user,
   wherein each of the first object and the second object represents a function using the external storage,
   wherein the first object is an object that receives an operation reading out image data stored in the external storage connected to the multifunction peripheral and printing the read-out image data using the print unit, and
   wherein the second object is an object that receives an operation for storing the image data scanned by the scan unit in the external storage connected to the multifunction peripheral.

2. The multifunction peripheral according to claim 1, wherein the display displays the menu screen having a software key as the second object to receive an operation to store the image data generated by reading of the document as one of software keys displayed in the menu screen for causing the multifunction peripheral to perform a plurality of functions respectively, in a case where the external storage is connected to the multifunction peripheral.

3. The multifunction peripheral according to claim 1,
wherein the instructions further causes the multifunction peripheral to obtain user information for specifying a user who uses the multifunction peripheral, and
wherein the display displays the menu screen based on the obtained user information.

4. The multifunction peripheral according to claim 1, wherein the display of the first object and the second object after changing the display of the first object and the second object are larger in size than the first object and the second object before changing the display of the first object and the second object.

5. The multifunction peripheral according to claim 1, wherein the display of the first object and the second object before changing the display of the first object and the second object is grayed out.

6. A method for a multifunction peripheral having a display, a print unit and a scan unit to read a document and being capable of connecting to an external storage, the method comprising:
displaying a menu screen, on the display, the menu screen including objects each for receiving an operation for causing the multifunction peripheral from a user to perform a function of the multifunction peripheral, the objects including a first object and a second object,
in a case where the external storage is not connected to the multifunction peripheral, display the first object and the second object displayed on the menu screen in a first display, and
in a case where the external storage is connected to the multifunction peripheral, change a display of the first object and a display of the second object on the menu screen from the first display to a second display, the first object and the second object displayed in the second display being able to receive the operation of the user,
wherein each of the first object and the second object represents a function using the external storage,
wherein the first object is an object that receives an operation reading out image data stored in the external storage connected to the multifunction peripheral and printing the read-out image data using the print unit, and
wherein the second object is an object that receives an operation for storing the image data scanned by the scan unit in the external storage connected to the multifunction peripheral.

7. The method according to claim 6, wherein the displaying displays the menu screen having a software key as the second object to receive an operation to store the image data generated by reading of the document as one of software keys displayed in the menu screen for causing the multifunction peripheral to perform a plurality of functions respectively, in a case where the external storage is connected to the multifunction peripheral.

8. The method according to claim 6, further comprising obtaining user information for specifying a user who uses the multifunction peripheral,
wherein the displaying displays the menu screen based on the obtained user information.

9. The method according to claim 6, wherein the display of the first object and the second object after changing the display of the first object and the second object is larger in size than the display of the first object and the second object before changing the display of the first object and the second object.

10. The method according to claim 6, wherein the display of the first object and the second object before changing the display of the first object and the second object is grayed out.

11. A non-transitory computer readable storage medium storing a computer-executable program of instructions for causing a computer to perform a method for a multifunction peripheral having a display, a print unit and a scan unit to read a document and being capable of connecting to an external storage, the method comprising:
displaying a menu, on the display, the menu screen including objects each for receiving an operation for causing the multifunction peripheral from a user to perform a function of the multifunction peripheral, the objects including a first object and a second object,
in a case where an external storage is not connected to the multifunction peripheral, display the first object and the second object displayed on the menu screen in a first display, and
in a case where the external storage is connected to the multifunction peripheral, change a display of the first object and a display of the second object on the menu screen from the first display to a second display, the first object and the second object displayed in the second display being able to receive the operation of the user,
wherein each of the first object and the second object represents a function using the external storage,
wherein the first object is an object that receives an operation for reading out image data stored in the external storage connected to the multifunction peripheral and printing the read-out image data using the print unit, and
wherein the second object is an object that receives an operation for storing the image data scanned by the scan unit in the external storage connected to the multifunction peripheral.

12. The non-transitory computer readable storage medium according to claim 11, wherein the displaying displays the menu screen having a software key as the second object to receive an operation to store the image data generated by reading of the document as one of software keys displayed in the menu screen for causing the multifunction peripheral to perform a plurality of functions respectively, in a case where the external storage is connected to the multifunction peripheral.

13. The non-transitory computer readable storage medium according to claim 11, further comprising obtaining user information for specifying a user who uses the multifunction peripheral,
wherein the displaying displays the menu screen based on the obtained user information.

14. The non-transitory computer readable storage medium according to claim 11, wherein the display of the first object and the second object after changing the display of the first object and the second object is larger in size than the display of the first object and the second object before changing the display of the first object and the second object.

15. The non-transitory computer readable storage medium according to claim 11, wherein the display of the first object and the second object before changing the display of the first object and the second object is grayed out.

16. A multifunction peripheral capable of connecting to an external storage, the multifunction peripheral comprising:
- a display;
- a print unit;
- a scan unit to read a document;
- a controller including a processor and a memory;
- wherein the controller is configured to
    - display a menu screen, on the display, the menu screen including objects each for receiving an operation for causing the multifunction peripheral from a user to perform a function of the multifunction peripheral, the objects including a first object and a second object,
    - in a case where an external storage is not connected to the multifunction peripheral, display the first object and the second object displayed on the menu screen in a first display, and
    - in a case where the external storage is connected to the multifunction peripheral, change a display of the first object and a display of the second object on the menu screen from the first display to a second display, the first object and the second object displayed in the second display being able to receive the operation of the user,
- wherein each of the first object and the second object represents a function using the external storage,
- wherein the first object is an object that receives an operation reading out image data stored in the external storage connected to the multifunction peripheral and printing the read-out image data using the print unit, and
- wherein the second object is an object that receives an operation for storing the image data scanned by the scan unit in the external storage connected to the multifunction peripheral.

* * * * *